(12) United States Patent
Lousteau et al.

(10) Patent No.: US 11,499,653 B2
(45) Date of Patent: *Nov. 15, 2022

(54) METHODS AND APPARATUS FOR PULLING FLEXIBLE PIPE

(71) Applicant: TRINITY BAY EQUIPMENT HOLDINGS, LLC, Houston, TX (US)

(72) Inventors: Matthew William Lousteau, Houston, TX (US); Alexander Lee Winn, Houston, TX (US); David Gregory, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 83 days.

This patent is subject to a terminal disclaimer.

(21) Appl. No.: 17/094,017

(22) Filed: Nov. 10, 2020

(65) Prior Publication Data
US 2021/0254753 A1    Aug. 19, 2021

Related U.S. Application Data

(63) Continuation of application No. 16/792,721, filed on Feb. 17, 2020, now Pat. No. 10,844,976.

(51) Int. Cl.
*F16L 1/032* (2006.01)
*E21B 7/04* (2006.01)

(52) U.S. Cl.
CPC ............. *F16L 1/032* (2013.01); *E21B 7/046* (2013.01)

(58) Field of Classification Search
CPC .......... E21B 7/046; E21B 31/12; E21B 31/18; E21B 31/20; F16L 1/032
(Continued)

(56) References Cited

U.S. PATENT DOCUMENTS

| 1,787,713 A | 1/1931 | Yungling |
| 2,802,691 A | 8/1957 | Barr |

(Continued)

FOREIGN PATENT DOCUMENTS

| AU | 2014299014 | 1/2019 |
| AU | 2014363465 | 1/2019 |

(Continued)

OTHER PUBLICATIONS

Government of Pakistan, Intellectual Property Organization; Office Action issued in connection to patent application No. 136/2021; dated Sep. 6, 2021; 2 pages; Pakistan.

(Continued)

*Primary Examiner* — Dean J Kramer
(74) *Attorney, Agent, or Firm* — Greenberg Traurig, LLP; Dwayne L. Mason; Mark G. Chretien

(57) ABSTRACT

A pull head assembly for quick attachment to a flexible pipe is provided. The pull head assembly has three subsections. A collet assembly is mounted to the end of a flexible pipe. A mandrel assembly is adapted to go over the collet assembly. A lead screw assembly positions the mandrel assembly over the collet assembly and acts as an attachment point for pulling the flexible pipe and pull head assembly from one location to another. After pulling the flexible pipe and pull head assembly from one location to another, the mandrel assembly and lead screw assembly can be removed, and the collet assembly can act as a temporary fitting for the flexible pipe.

20 Claims, 11 Drawing Sheets

(58) Field of Classification Search
USPC .................. 294/86.12, 86.15, 86.28, 86.3
See application file for complete search history.

(56) References Cited

U.S. PATENT DOCUMENTS

| | | | |
|---|---|---|---|
| 3,989,400 | A | 11/1976 | Smith et al. |
| 4,568,221 | A | 2/1986 | Lerique |
| 5,642,912 | A | 7/1997 | Parish, II |
| 5,775,742 | A | 7/1998 | Guest |
| 6,086,044 | A | 7/2000 | Guest |
| 6,145,894 | A | 11/2000 | Myers |
| 6,311,792 | B1 * | 11/2001 | Scott ................. E21B 33/0422 166/85.1 |
| 6,511,099 | B2 | 1/2003 | Bartholoma et al. |
| 6,644,887 | B2 | 11/2003 | Hesse |
| 6,889,715 | B2 | 5/2005 | Fraser et al. |
| 7,055,551 | B2 | 6/2006 | Fraser et al. |
| 7,311,346 | B2 | 12/2007 | Bakke |
| 7,891,924 | B2 | 2/2011 | Mercer et al. |
| 8,220,129 | B2 | 7/2012 | Eccleston et al. |
| 8,720,963 | B2 | 5/2014 | Nguyen |
| 8,882,156 | B2 | 11/2014 | Guest |
| 9,085,945 | B2 | 7/2015 | Heieie |
| 10,190,722 | B2 | 1/2019 | Espinasse et al. |
| 10,197,198 | B2 | 2/2019 | Glejbol |
| 10,226,823 | B2 | 3/2019 | Karpachevskyy |
| 10,226,892 | B2 | 3/2019 | Kremers |
| 10,234,068 | B2 | 3/2019 | Varagnolo et al. |
| 10,281,065 | B2 | 5/2019 | Secher et al. |
| 10,285,223 | B2 | 5/2019 | Hatton et al. |
| 10,288,207 | B2 | 5/2019 | Littlestar et al. |
| 10,378,682 | B2 | 8/2019 | Cloos et al. |
| 10,408,795 | B2 | 9/2019 | Nicolas et al. |
| 10,415,731 | B2 | 9/2019 | Boche et al. |
| 10,429,267 | B2 | 10/2019 | Grimsley |
| 10,436,667 | B2 | 10/2019 | Littlestar et al. |
| 10,442,925 | B2 | 10/2019 | Rong et al. |
| 10,451,206 | B2 | 10/2019 | Espinasse et al. |
| 10,471,661 | B2 | 11/2019 | Boczkowski et al. |
| 10,480,054 | B2 | 11/2019 | Valdez et al. |
| 10,487,965 | B2 | 11/2019 | Bouey et al. |
| 10,494,519 | B2 | 12/2019 | Wilson et al. |
| 10,513,896 | B2 | 12/2019 | Gudme et al. |
| 10,527,198 | B2 | 1/2020 | Nicolson et al. |
| 10,544,889 | B2 | 1/2020 | Bouey et al. |
| 10,544,892 | B2 | 1/2020 | Holst |
| 10,597,262 | B2 | 3/2020 | Barbu et al. |
| 10,844,976 | B1 | 11/2020 | Lousteau |
| 2004/0218982 | A1 | 11/2004 | Wentworth et al. |
| 2013/0257043 | A1 | 10/2013 | Guest |
| 2019/0003921 | A1 | 1/2019 | Nicholas |
| 2019/0024830 | A1 | 1/2019 | Glejbol |
| 2019/0094101 | A1 | 3/2019 | Spiegel et al. |
| 2019/0101233 | A1 | 4/2019 | Hatton et al. |
| 2019/0126567 | A1 | 5/2019 | Bornemann et al. |
| 2019/0154186 | A1 | 5/2019 | Varagnolo et al. |
| 2019/0162334 | A1 | 5/2019 | Westhoff et al. |
| 2019/0162335 | A1 | 5/2019 | Yu et al. |
| 2019/0162336 | A1 | 5/2019 | Andersen et al. |
| 2019/0186656 | A1 | 6/2019 | Kozak et al. |
| 2019/0194440 | A1 | 6/2019 | Rong et al. |
| 2019/0217337 | A1 | 7/2019 | Gujare et al. |
| 2019/0219473 | A1 | 7/2019 | Littlestar et al. |
| 2019/0242501 | A1 | 8/2019 | Bereczkne et al. |
| 2019/0257448 | A1 | 8/2019 | Chalmers et al. |
| 2019/0285199 | A1 | 9/2019 | Nicolson et al. |
| 2019/0309582 | A1 | 10/2019 | Procida |
| 2019/0338868 | A1 | 11/2019 | Hjorth |
| 2019/0368967 | A1 | 12/2019 | Grimsley |
| 2019/0391097 | A1 | 12/2019 | Nicolas et al. |
| 2020/0011467 | A1 | 1/2020 | Holst |

FOREIGN PATENT DOCUMENTS

| | | |
|---|---|---|
| AU | 2017302735 | 1/2019 |
| AU | 2014310509 | 3/2019 |
| AU | 2017319390 | 3/2019 |
| AU | 2017347152 | 5/2019 |
| AU | 2017365730 | 6/2019 |
| AU | 2018211384 | 8/2019 |
| AU | 2018222217 | 8/2019 |
| AU | 2015335367 | 10/2019 |
| AU | 2015345613 | 10/2019 |
| AU | 2018288000 | 1/2020 |
| AU | 2019279941 | 1/2020 |
| BR | 112014017998 | 1/2019 |
| BR | 112018013586 | 1/2019 |
| BR | PI0810573 | 1/2019 |
| BR | PI0819542 | 1/2019 |
| BR | 112019001414 | 2/2019 |
| BR | 112018075840 | 3/2019 |
| BR | 112019004048 | 3/2019 |
| BR | PI0517181 | 3/2019 |
| BR | 112019000076 | 4/2019 |
| BR | 112019007789 | 4/2019 |
| BR | PI0914836 | 4/2019 |
| BR | 112019003669 | 5/2019 |
| BR | 112019005154 | 6/2019 |
| BR | 112013032388 | 7/2019 |
| BR | 112019013850 | 7/2019 |
| BR | PI0720487 | 8/2019 |
| BR | 112012015257 | 9/2019 |
| BR | 112013017957 | 9/2019 |
| BR | 112015027495 | 9/2019 |
| BR | 112016001932 | 9/2019 |
| BR | PI0909348 | 9/2019 |
| BR | 112015002088 | 10/2019 |
| BR | 112019020051 | 10/2019 |
| BR | 112012020776 | 11/2019 |
| BR | 112019012614 | 11/2019 |
| BR | PI0808956 | 11/2019 |
| BR | 112013028806 | 12/2019 |
| BR | 112013000428 | 1/2020 |
| BR | PI0924891 | 1/2020 |
| CA | 2859433 | 3/2019 |
| CA | 2823056 | 4/2019 |
| CA | 2765294 | 6/2019 |
| CA | 2854955 | 6/2019 |
| CA | 2835008 | 8/2019 |
| CA | 3012146 | 1/2020 |
| CN | 102758984 | 10/2012 |
| CN | 108361466 | 8/2018 |
| CN | 109153196 | 1/2019 |
| CN | 109153229 | 1/2019 |
| CN | 109958827 | 7/2019 |
| CN | 110177969 | 8/2019 |
| CN | 106985493 | 11/2019 |
| CN | 108291686 | 11/2019 |
| CN | 110461586 | 11/2019 |
| CN | 110462273 | 11/2019 |
| CN | 107250643 | 12/2019 |
| CN | 108291670 | 1/2020 |
| DE | 9410981 | 11/1994 |
| DE | 102009021700 | 11/2010 |
| DE | 202013009587 | 1/2015 |
| DE | 102018214615 | 6/2019 |
| DK | 3224393 T3 | 1/2019 |
| DK | 2820083 T3 | 2/2019 |
| DK | 2959199 T5 | 2/2019 |
| DK | 3228639 T3 | 2/2019 |
| DK | 2780159 T3 | 4/2019 |
| DK | 3196523 T3 | 4/2019 |
| DK | 2516534 | 7/2019 |
| DK | 2901502 T3 | 8/2019 |
| DK | 3286474 T3 | 9/2019 |
| EP | 152683 | 12/1988 |
| EP | 719972 | 7/1996 |
| EP | 722553 | 7/1996 |
| EP | 869308 | 11/2002 |
| EP | 1540219 | 5/2007 |
| EP | 2022932 | 6/2010 |

(56) References Cited

FOREIGN PATENT DOCUMENTS

| | | |
|---|---|---|
| EP | 2360406 | 1/2019 |
| EP | 2780159 | 1/2019 |
| EP | 3069063 | 1/2019 |
| EP | 3433523 | 1/2019 |
| EP | 3089846 | 2/2019 |
| EP | 3334969 | 2/2019 |
| EP | 3334970 | 2/2019 |
| EP | 3439871 | 2/2019 |
| EP | 2386894 | 3/2019 |
| EP | 2516534 | 3/2019 |
| EP | 2737238 | 3/2019 |
| EP | 2859173 | 3/2019 |
| EP | 3371502 | 3/2019 |
| EP | 3455059 | 3/2019 |
| EP | 3455536 | 3/2019 |
| EP | 3458531 | 3/2019 |
| EP | 2862700 | 4/2019 |
| EP | 3105484 | 4/2019 |
| EP | 3258155 | 4/2019 |
| EP | 3334965 | 4/2019 |
| EP | 3334967 | 4/2019 |
| EP | 3463849 | 4/2019 |
| EP | 3468725 | 4/2019 |
| EP | 3314155 | 5/2019 |
| EP | 3488135 | 5/2019 |
| EP | 2519764 | 6/2019 |
| EP | 2572134 | 7/2019 |
| EP | 2661578 | 7/2019 |
| EP | 3507535 | 7/2019 |
| EP | 3513108 | 7/2019 |
| EP | 2576333 | 8/2019 |
| EP | 3014157 | 8/2019 |
| EP | 3059481 | 8/2019 |
| EP | 3526437 | 8/2019 |
| EP | 2588787 | 9/2019 |
| EP | 2870397 | 9/2019 |
| EP | 3093546 | 10/2019 |
| EP | 3548280 | 10/2019 |
| EP | 3350498 | 12/2019 |
| EP | 3482112 | 12/2019 |
| EP | 3583344 | 12/2019 |
| FR | 3068104 | 7/2019 |
| FR | 3077997 | 8/2019 |
| FR | 3074251 | 12/2019 |
| FR | 3076337 | 1/2020 |
| GB | 2072780 | 10/1984 |
| GB | 2218487 | 7/1992 |
| GB | 2503880 | 3/2019 |
| GB | 2562674 | 3/2019 |
| GB | 2557571 | 9/2019 |
| GB | 2572120 | 9/2019 |
| GB | 2520756 | 10/2019 |
| GB | 2535925 | 12/2019 |
| GB | 2574296 | 12/2019 |
| HU | E045956 T2 | 1/2020 |
| IN | 330637 | 1/2020 |
| JP | 4227081 | 2/2009 |
| NL | 1034338 | 3/2009 |
| NL | 1034340 | 3/2009 |
| PL | 2678216 T3 | 2/2019 |
| PL | 2379299 T3 | 5/2019 |
| RU | 2018113428 | 10/2019 |
| WO | 2019/016554 | 1/2019 |
| WO | 2019/016558 | 1/2019 |
| WO | 2019/073047 | 4/2019 |
| WO | 2019/022599 | 5/2019 |
| WO | 2019/099219 | 5/2019 |
| WO | 2019/105926 | 6/2019 |
| WO | 2019/112431 | 6/2019 |
| WO | 2019/120677 | 6/2019 |
| WO | 2019/141326 | 7/2019 |
| WO | 2019/165562 | 9/2019 |
| WO | 2019/197538 | 10/2019 |
| WO | 2019/207031 | 10/2019 |
| WO | 2019/238456 | 12/2019 |
| WO | 2020/016325 | 1/2020 |
| WO | 2020/198708 | 10/2020 |
| WO | 2021/168021 | 8/2021 |

OTHER PUBLICATIONS

United States Patent and Trademark Office; PCT International Search Report, issued in connection to PCT/US21/018435; dated Mar. 17, 2021; 2 pages; US.
United States Patent and Trademark Office; PCT Written Opinion of the International Searching Authority, issued in connection to PCT/US21/018435; dated Mar. 17, 2021; 4 pages; US.
Pipe Equipment Specialists Ltd; Towing Heads; https://www.pipe-equipment.co.uk/catalog/products/towing-heads/; printed Nov. 20, 2019; 4 pages.

* cited by examiner

METHODS AND APPARATUS FOR PULLING FLEXIBLE PIPE

BACKGROUND

Flexible pipe can be utilized to transport production fluids, such as oil and/or gas and/or water, from one location to another. However, to move a flexible pipe into the correct location for use, the pipe is sometimes pulled through a pre-dug borehole existing pipeline, or through various terrains.

A pulling head is a fitting that is attached to the end of a pipe that makes it possible to pull the pipe through a borehole. It is commonly used in small-diameter horizontal directional drilling (HDD) operations for the easy installation of pipe. The process of pulling pipe is essential to many trenchless construction methods.

Some existing pipe pulling heads are removable and reusable attachments that are fitted to pipes during the installation phase of horizontal directional drilling. Once the pilot hole is excavated and the borehole is reamed to the desired size, then it is time to pull the pipe through the hole. The pipe to be installed is usually held at the exit pit of the operation awaiting the completion of the borehole excavation. Pull heads are also used to move pipe through trenches and from one point to another for other upstream or midstream applications.

In the conventional process, the removable pull head is attached to the pipe at the first side. The pipe is then pulled underground through the borehole from the first side to the second side. At the second side, the pull head is removed from the pipe, a section of pipe is then cut from the pipe end, and a pipe adaptor is then attached to the end of the pipe. The end of a new section of pipe is then joined to the pipe adaptor to continue the pipeline.

Most removable pull heads in current use offer a relatively loose fit that does not seal well. In the case of flexible pipe, which can include several layers of composite materials and armor layers, these pull heads also obscure or exclude annular or bore access of the flexible pipe itself. To pressure test the pipe on site after pulling the pipe through a bore in the ground, a ditch, or along various terrain, the entire apparatus must be removed and a new fitting installed at that time. In such instances the pull head is reusable, but pipe access for testing procedures is limited.

Other currently used pull heads are swaged onto the pipe. This forms a permanent connection that seals well and allows for pressure testing on site, but the pull head is not removable. This method is prohibitively expensive, as it only allows for one-time use of the pull head.

SUMMARY

The present disclosure generally pertains to methods and apparatuses for assembling and using pull heads for flexible pipe. Certain embodiments of the disclosure pertain to a pull head assembly includes a lead screw assembly, a mandrel assembly, and a collet assembly. More particularly, the lead screw assembly includes a lead screw having a distal end with outward facing threads and a proximal end. The mandrel assembly includes a mandrel body with a proximal end and a distal end, and an inner diameter. Still further, the mandrel assembly has a lead screw retainer secured to the proximal end of the mandrel body. The lead screw retainer includes a central bore adapted to receive the distal end of the lead screw. Likewise, the collet assembly includes: a collet jacket with an inner and outer diameter, the inner diameter being adapted to secure an outer diameter of a flexible pipe body; a pipe insert with an inner and outer diameter, the outer diameter being adapted to secure an inner diameter of a flexible pipe body; and a lead screw receiver comprising a bore with inward facing threads adapted to threadingly engage the outward facing threads of the lead screw.

Additional embodiments concerning the pull head assembly include an annular ring adapted to fit over the outermost layer or diameter of a flexible pipe body, wherein the flexible pipe has a distal end and a proximal end, and wherein when the pipe insert is inserted into the proximal end of the flexible pipe body, the collet jacket at least partially covers the proximal end of the flexible pipe body.

In further embodiments of the pull head assembly, when the proximal end of the collet jacket assembly is inserted into the distal end of the mandrel assembly and the lead screw cylindrical shaft threadingly engages the lead screw receiver. In such embodiments, rotation of the lead screw moves the collet assembly in a proximal direction.

In certain further embodiments of the pull head assembly concerning the juxtaposition of the mandrel body and the collet jacket, the inner diameter of the mandrel body can abut the outer diameter of the collet jacket. Likewise, in certain embodiments, the mandrel body applies an inward radial force to the collet jacket.

In certain further embodiments concerning the collet jacket assembly, the collet jacket includes a pressure port that provides access to an annulus of the flexible pipe body. Alternatively, or additively, in certain embodiments, the collet jacket assembly includes a pressure port that provides access to beneath the innermost layer of the flexible pipe body.

In particular embodiments of the disclosure pertaining to the lead screw assembly, the lead screw assembly can include a bore extending distally from the proximal end of the lead screw. In such embodiments, the bore typically has inward facing threads. Likewise, the lead screw assembly can include a swivel lift retaining bolt with a distal end having outward facing threads adapted to threadingly secure the swivel lift retaining bolt to the bore of the lead screw. Still further, in certain embodiments of the disclosure, the lead screw assembly includes a swivel lift radially surrounding a portion of the swivel lift retaining bolt and a pull ring secured to the outer diameter of the swivel lift.

Other embodiments of the disclosure pertain to a method of assembling a pull head assembly for towing a flexible pipe. The method first includes assembling a mandrel assembly having a mandrel body with a proximal end and a distal end, the mandrel body further having an inner diameter. Assembling the mandrel assembly itself includes: securing a lead screw retainer to the proximal end of the mandrel body, the lead screw retainer end having a central bore adapted to receive the distal end of a lead screw; and securing one or more mandrel bearings surrounding the central bore of the lead screw receiving end. The method of assembling the pull head assembly further includes inserting a distal end of a lead screw through the central bore and clamping the lead screw to the mandrel assembly, the lead screw having outward facing threads at its distal end and further having a proximal end. Still further, the method includes mounting a collet assembly to an end of the flexible pipe. With respect to the collet assembly, the collet assembly includes a collet jacket with an inner and outer diameter, the inner diameter being adapted to secure an outer diameter of a flexible pipe body; a pipe insert with an inner and outer diameter, the outer diameter being adapted to secure an inner diameter of the flexible pipe body, and the inner diameter being adapted to receive a lead screw receiver; and a lead screw receiver comprising a bore with inward facing threads adapted to threadingly engage the outward facing threads of the lead screw. With respect to the method of assembly, the method further includes pushing the proximal end of the collet jacket assembly into the distal end of the mandrel assembly until the lead screw threadingly engages the lead screw receiver; and rotating the lead screw in a direction to pull the collet jacket assembly and flexible pipe into the mandrel assembly and secure the flexible pipe body to the collet jacket assembly.

In certain further embodiments, the collet jacket has collet jacket serrations, and the method further includes compressing the collet jacket serrations into an outermost layer of the flexible pipe to secure the flexible pipe body to the collet jacket. Likewise, in certain embodiments, the collet jacket is radially compressed by moving the collet jacket proximally into the mandrel assembly.

In other embodiments of the method concerning the collet jacket, the collet jacket assembly has one or more pressure ports extending externally from the jacket assembly to one or more of the annulus of the flexible pipe body and beneath the innermost layer of the pipe. In this embodiment, the method includes pressure testing through the one or more pressure ports.

Further methods of assembling a pull head assembly as described above concern assembling a lead screw assembly. The lead screw assembly includes: a bore with inward facing threads extending distally from the proximal end of the lead screw; a swivel lift retaining bolt with a distal end having a first outer diameter and outward facing threads adapted to threadingly secure the swivel lift retaining bolt within the bore of the cylindrical shaft, and a proximal end having a second outer diameter greater than the first outer diameter; and a swivel lift comprising a cylinder having a bore adapted to receive the swivel lift retaining bolt. The method of assembling the lead screw assembly itself includes securing a pull ring to the swivel lift and inserting the retaining bolt through the bore of the swivel lift and into the bore of the lead screw.

In the aforementioned methods, a further step of connecting the pull ring of the pull head assembly to a cable and pulling the flexible pipe body and pull head assembly to a desired location can be included. Likewise, upon movement of the flexible pipe body and pull head assembly to a desired location, the method can include rotating the lead screw in a direction such that the collet jacket assembly and flexible pipe body are pushed out from the mandrel assembly; and removing the collet jacket assembly and flexible pipe body from the mandrel assembly.

Other aspects and advantages of the claimed subject matter will be apparent from the following description and the appended claims.

While certain embodiments of the presently disclosed subject matter will be described in connection with the present exemplary embodiments shown herein, it will be understood that it is not intended to limit the invention to those embodiments. On the contrary, it is intended to cover all alternatives, modifications, and equivalents, as may be included within the spirit and scope of the invention as defined by the appended claims.

DETAILED DESCRIPTION

The presently disclosed subject matter generally relates to pull heads for flexible pipe.

A flexible pipe is composed of a composite of layered materials that form a pressure-containing conduit and the pipe structure allows large deflections. Normally, the flexible pipe is built up as a composite structure composed of metallic and polymer layers. Flexible pipe and its various uses are generally described in, e.g., U.S. Pat. No. 6,889,715 issued May 10, 2005, U.S. Pat. No. 7,055,551 issued Jun. 6, 2006, and U.S. Pat. No. 8,220,129 issued Jul. 17, 2012, as well as API RP 17B ("17B Recommended Practice for Unbonded Flexible Pipe") and API 15S ("Spoolable Composite Pipeline Systems"), the contents of each of which are incorporated by reference herein in their entirety.

Flexible pipe, or also referred to as spoolable pipe, can include Bonded or Unbonded Flexible Pipe, Flexible Composite Pipe (FCP), Thermoplastic Composite Pipe (TCP), or Reinforced Thermoplastic Pipe (RTP). FCP or RTP pipe can itself be generally composed of several layers. In one or more embodiments, a flexible pipe can include a thermoplastic liner or internal pressure sheath having a reinforcement layer and a thermoplastic outer cover layer. In one or more embodiments, the thermoplastic may be high-density polyethylene (HDPE). Thus, flexible pipe can include different layers that can be made of a variety of materials and also may provide corrosion resistance. For example, in one or more embodiments, the pipe can have a corrosion protection outer cover layer that is disposed over another layer of steel reinforcement. In this embodiment, helically wound steel strips can be placed over a liner made of thermoplastic pipe. Flexible pipe can be designed to handle a variety of pressures, temperatures, and conveyed fluids. Further, flexible pipe can offer unique features and benefits versus steel/carbon steel pipe lines in the area of corrosion resistance, flexibility, installation speed and re-usability. Another type of flexible or spoolable pipe is coiled tubing, which can be made of steel and have a corrosion protection sheath layer.

Figure 1:
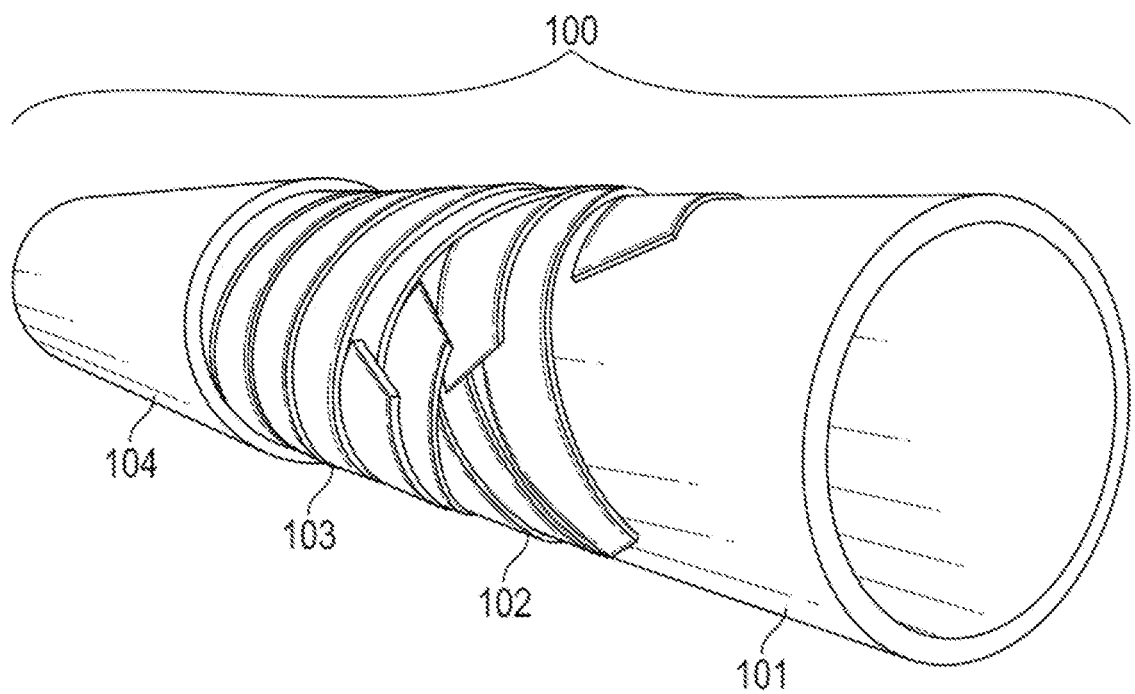
FIG. 1 is a cross section of flexible pipe according to the embodiments of the present disclosure.

FIG. 1 shows an illustrative embodiment of a pipe body 100 of a flexible pipe in cross section. Pipe body 100 is formed from a composite of layered materials that form a pressure-containing conduit. Although a number of particular layers are illustrated in FIG. 1, it is to be understood that the presently disclosed subject matter is broadly applicable to composite pipe body structures including two or more layers (as distinguished from, e.g., rubber or plastic single-layer hose subject to vulcanization) designed and manufactured to meet API 15 S and API 17J, and capable of containing pressures up to 3,000 psi or more. API 17J requires that the stresses on the metallic layers and strains on the polymer layers be limited to specified values for all of the various loading, and an exemplary specification of the spoolable composite pipe is set forth in FIG. 1 and in Table 1.

TABLE 1

| STEEL REINFORCED THERMOPLASTIC PIPE | NON-METALLIC REINFORCED THERMOPLASTIC PIPE |
|---|---|
| API 17J/17K/15S | API 15HR/15S |
| ASTM F2805 | ASTM F2686 |
| CSA Z662 | CSA Z662 |
| SO 18226 | ISO 18226 |

As seen in FIG. 1, pipe body 100 includes an internal pressure sheath 101, a pressure armor layer 102, a tensile armor layer 103, and an external sheath layer 104. The internal pressure sheath 101 typically includes a polymer layer that ensures internal-fluid integrity. It is to be understood that this barrier layer may itself include a number of sub-layers. The pressure armor layer 102 is a structural layer that increases the resistance of the flexible pipe to internal and external pressure and mechanical crushing loads. The layer also structurally supports the internal-pressure sheath and typically consists of an interlocked metallic construction. The flexible pipe body 100 may also include one or more layers of tape (not shown). The tensile armor layer 103 is a structural layer used to sustain tensile loads and internal pressure. The flexible pipe body 100 may also include insulation layers (not shown) and the external sheath layer 104 which includes a polymer layer used to protect the pipe against penetration of seawater and other external environments, corrosion, abrasion and mechanical damage.

Various illustrative embodiments of a pull head assembly 10 and its various components for pulling flexible pipe are disclosed in FIGS. 2-13 herein.

Figure 2:
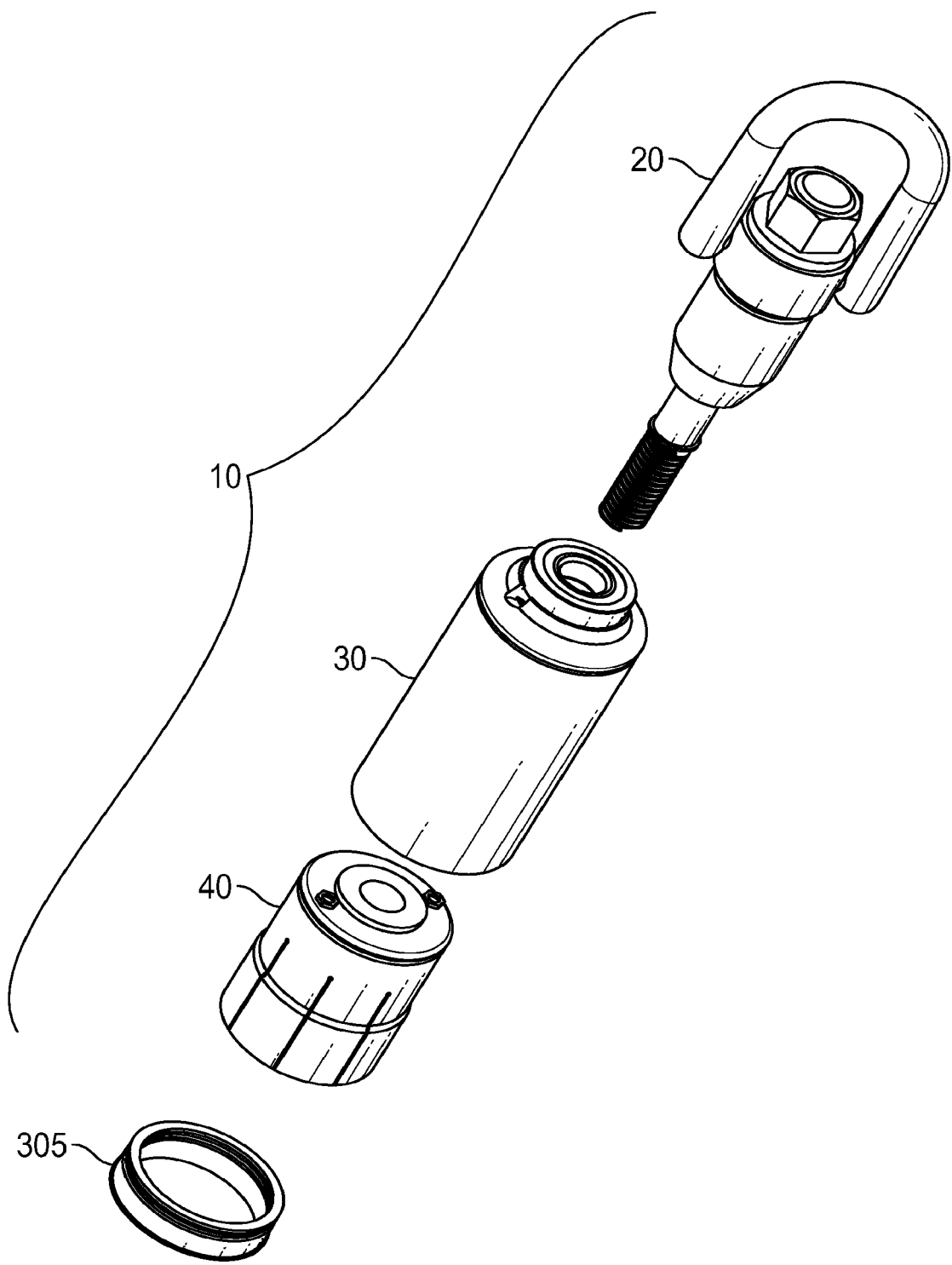
FIG. 2 is an external view of a partially deconstructed pull head assembly according to the embodiments of the present disclosure.

In the illustrative embodiment of FIG. 2, pull head assembly 10 is shown in an exploded configuration, and includes a lead screw assembly 20, a mandrel assembly 30, and a collet assembly 40. An annulus ring 305 is also shown. Typically, the annulus ring 305 is positioned over the outermost layer of a flexible pipe body.

In certain illustrative embodiments, the lead screw assembly 20 connects, via a cable or chain, the pull head assembly 10 and an attached flexible pipe to external machinery such that assembly 10 and the flexible pipe can be pulled. Lead screw assembly 20 has a threaded distal end that rotates relative to the mandrel assembly 30 and can threadingly engage the collet jacket assembly 40.

In certain illustrative embodiments, the mandrel assembly 30 is a hollow bell-shaped assembly that has a narrow proximal end that retains the lead screw assembly 20 and a wider distal end that retains the proximal end of the flexible pipe via the collet assembly 40. The mandrel assembly 30 houses the proximal end of the flexible pipe so that it can be pulled through a wellbore, dirt, mud, or other slurries and liquids efficiently and without exposing the inside of the pipe to undesired contaminants. The mandrel assembly 30 allows the distal end of the end of the lead screw assembly 20 to be inserted into the proximal end of the collet assembly 40, locked into place by the mandrel assembly 30, and allowed to rotate within the mandrel assembly 30. The collet assembly 40 receives the proximal end of the flexible pipe (as further illustrated in FIGS. 13A and 13B) and is capped by the mandrel assembly 30. The mandrel assembly 30 keeps the lead screw assembly 20 in place as the distal end of the lead screw assembly 20 threadingly engages the collet assembly 40 and pulls it further into the mandrel assembly 30 or pushes it out of the mandrel assembly 30 as required.

In certain illustrative embodiments, the collet assembly 40 is a thimble shaped end cap that fits to the proximal end of the flexible pipe. Collet assembly 40 acts as an end fitting that is partially installed on the end of the flexible pipe and then compressed upon the mandrel assembly 30 being pulled over the collet assembly 40. The collet assembly 40 has a bore to threadingly receive the distal end of the lead screw assembly 20 so that the mandrel assembly 30 can be pulled over the collet assembly 40 and flexible pipe body 100 or pushed out of the mandrel assembly 30 depending on how the lead screw assembly 20 is rotated.

In certain illustrative embodiments, the components in FIG. 2, minus any elastic type seals, can be made out of typical material used in oil and gas fittings unless otherwise noted. Such materials include a variety of steel alloys, aluminum, titanium, tungsten, carbon fiber and the like. The specific choice of alloy or material will often be determined by factors such as strength to brittleness ratio, corrosion resistance, weight, and price. Examples of corrosion resistant metals include aluminum, nickel alloys, tungsten alloys, molybdenum alloys, tantalum alloys, chromium alloys and certain other stainless steel alloys.

Figure 3:
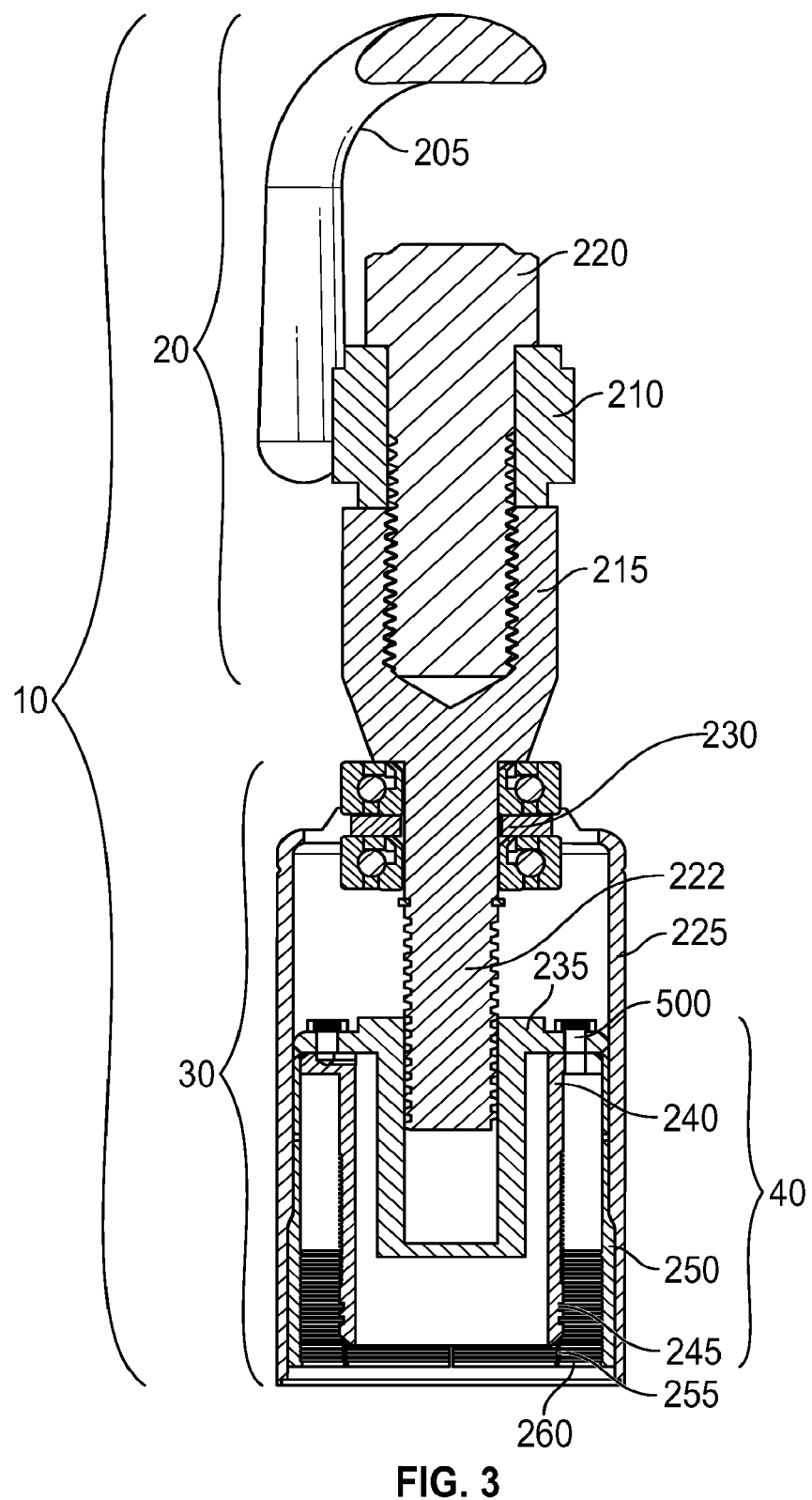
FIG. 3 is a cross sectional view of a pull head assembly with pressure ports according to the embodiments of the present disclosure.
Figure 4:
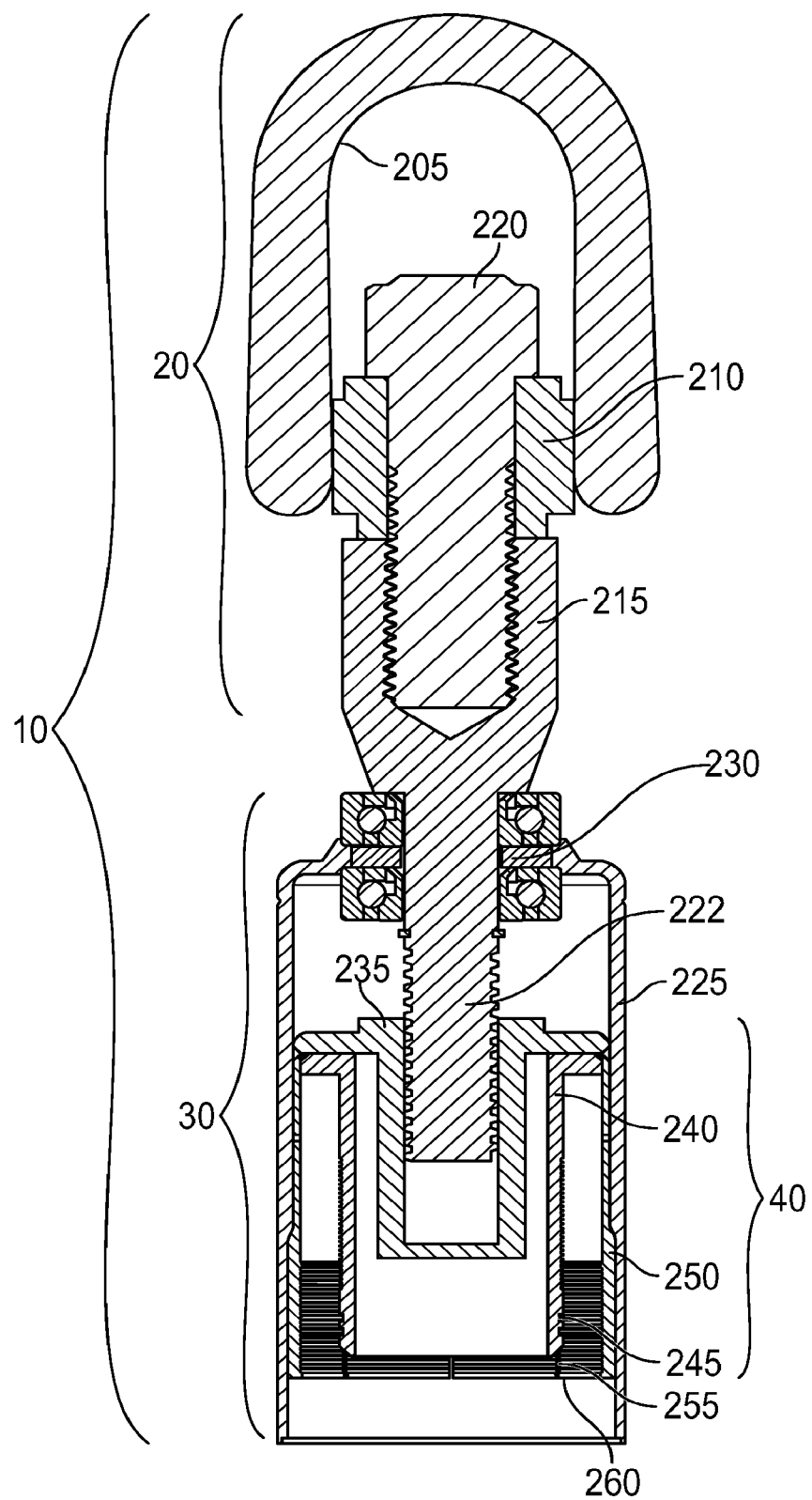
FIG. 4 is a cross sectional view of a pull head assembly without pressure ports according to the embodiments of the present disclosure.

In the illustrative embodiments of FIGS. 3-4, pull head assembly 10 is shown in an assembled cross-sectional configuration. In FIG. 3, pull head assembly 10 has a pull ring 205 secured to a swivel lift 210. The pull ring 205 is designed to attach to a chain or cable to pull the pull head assembly 10 to a desired location. The swivel lift rests against the proximal end of a lead screw 215, which itself has internal threading. The swivel lift 210 is threadingly secured to the lead screw 215 by a swivel lift retaining bolt 220. The swivel lift 210, in this configuration, acts to secure the pull ring 205 to the rest of the lead screw assembly 40. By threadingly securing the swivel lift 210 to the lead screw 215 through the swivel lift retaining bolt 220, the pull ring 205 can swing freely with respect to the swivel lift retaining bolt 220 to pull the pull head assembly 10 through a pre-dug borehole existing pipeline, or along through various terrains.

As further depicted in the illustrative embodiments of FIGS. 3-4, mandrel assembly 30 has a mandrel body 225 having a proximal end and a distal end and further having an inner diameter, and a lead screw retainer 230 having a central bore adapted to receive the distal end of the lead screw 215. The lead screw 215 has a lead screw mandrel 222 with its distal end disposed within the mandrel body 225 that is capable of rotation, but not axial movement as the lead screw mandrel 222 is secured to the mandrel body 225 by the lead screw retainer 230.

As further seen in FIGS. 3-4, pull head assembly 10 further includes a collet jacket assembly 40 with a lead screw receiver 235 disposed therein. The lead screw receiver 235 has inward facing threads and is threadingly secured to outward facing threads at the distal end of the lead screw mandrel 222 when the collet jacket assembly 40 is pushed proximally into the mandrel assembly 30 to the point where contact can be made. The lead screw receiver 235 further has an outwardly extending flange, which is viewable in cross section in FIGS. 3-4. Distal to the lead screw receiver 235 is a pipe insert 240. While the aforementioned figures show that the lead screw receiver 235 is within the pipe insert 240.

At or near the distal end of pipe insert 240 are one or more outward facing radial O-ring grooves 245 into which one or more O-rings are positioned. The O-rings are generally made of an elastomeric material such as rubber, silicone, and the like. One of the purposes of the O-rings is to provide a seal between the innermost layer of flexible pipe and the pipe insert 240 such that during any pressure testing or use of all or part of the collet assembly 40 as an end fitting, gas or liquid flowing through the flexible pipe does not escape, which could impact any testing procedures or impact production or environmental regulations.

Still further in reference to FIGS. 3-4, in operation the flexible pipe has a proximal end that will be fitted with the collet jacket assembly 40. In certain embodiments, annulus ring 305 as shown in FIG. 2 is first inserted into the flexible pipe. The collet jacket assembly 40 is subsequently fitted to the flexible pipe. First, O-rings are positioned over the outer diameter of the pipe insert 240 within the O-ring grooves 245. Simultaneously the pipe insert 240 and the collet jacket 250 are inserted beneath the innermost layer of flexible pipe and the outermost layer of flexible pipe respectively.

In certain illustrative embodiments, the collet jacket 250 has an outer diameter that is less than the larger inner diameter of the mandrel body 225. When the collet jacket 250 is retracted into the mandrel body 225, the outer diameter of the collet jacket 250 abuts the inner diameter of the mandrel body 225. The distal portion of the collet jacket 250 has a plurality of collet jacket fingers 255 cut into the collet jacket 250 from its inner diameter to its outer diameter leaving a space for movement. The collet jacket 250 further has collet jacket serrations 260. In operation, prior to insertion of the collet jacket 250 into the mandrel body 225, the collet jacket fingers 255 are in an expanded configuration. When the collet jacket 250 is drawn into the mandrel body 225 by rotation of the lead screw mandrel 222 against the lead screw receiver 235, the inner diameter of the mandrel body 225 presses against the outer diameter of the collet jacket 250. This causes the collet jacket fingers 255 to compress by moving inward and the collet jacket serrations 260 to dig into and secure the outer layer of the flexible pipe.

Referring to FIG. 3 and the collet assembly 40, the collet jacket 250 has pressure ports 500 disposed within the assembly. The pressure ports 500 enable testing equipment to be connected to assembly 10 to ensure pressure tolerances within the flexible pipe bore and within the annulus of the flexible pipe. FIG. 4 shows an alternative embodiment without the employment of pressure ports 500.

Figure 5:
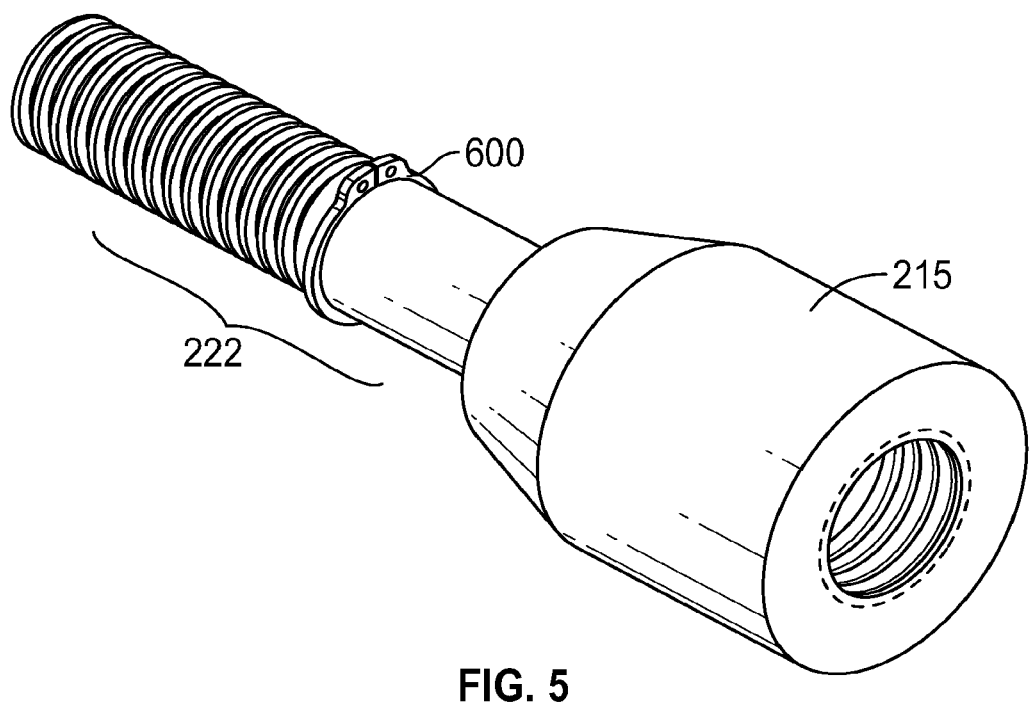
FIG. 5 is an external view of a lead screw assembly according to the embodiments of the present disclosure.

FIG. 5 provides an external view of the lead screw 215 with a retaining ring 600 positioned between the proximal and distal end of the lead screw mandrel 222. This retaining ring 600 retains the lead screw mandrel 222 within the lead screw retainer 230 as seen in FIG. 3. The retaining ring 600 acts to help secure the lead screw 215 within the mandrel body 225 by holding the retaining ring 600 within screw retainer 230. The retaining ring 600 can be made of durable materials such as stainless-steel alloys as found in previously described components.

Figure 6:
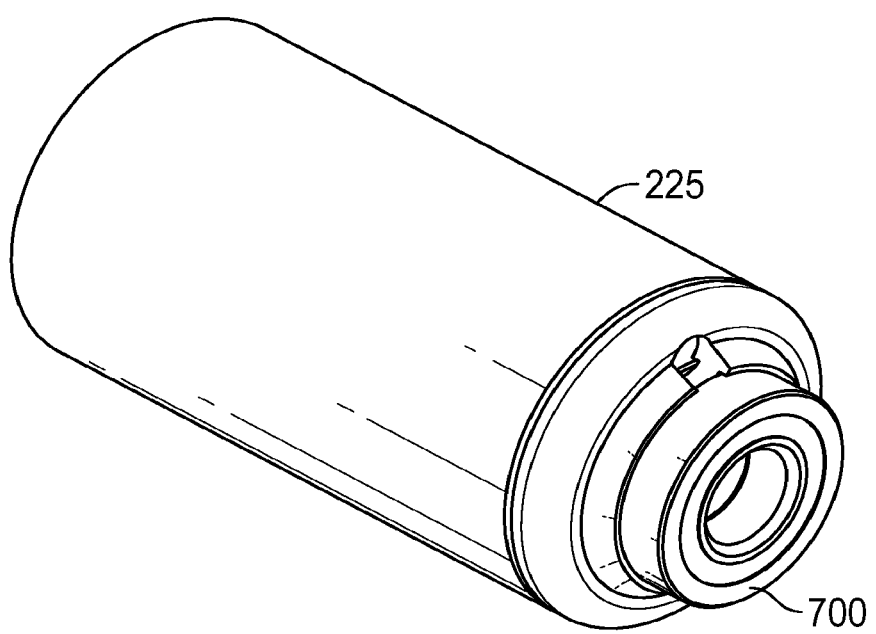
FIG. 6 is an external view of a mandrel assembly according to the embodiments of the present disclosure.
Figure 7:
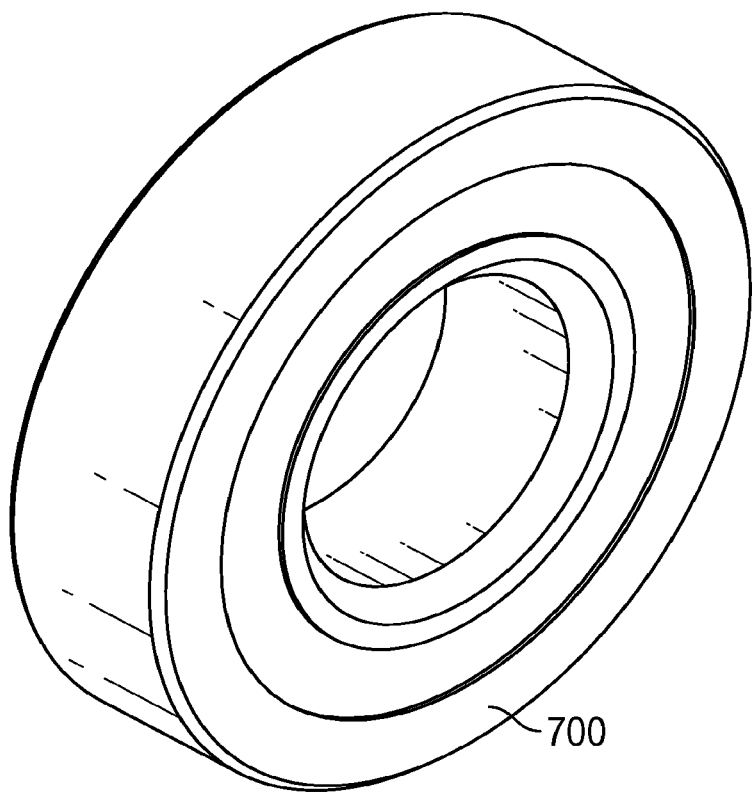
FIG. 7 is an external view of a mandrel bearing according to the embodiments of the present disclosure.

As shown in FIG. 6, the mandrel body 225 can possess a mandrel bearing 700 that can be mounted on its proximal end and can accept rotation of the lead screw mandrel 222 therewithin. Mandrel bearing 700 is shown alone in FIG. 7. The mandrel bearing 700 can include one or more ball bearings or other similar devices to aid in rotation. The mandrel bearing 700 typically includes components made of a metal such as a stainless-steel alloy and/or ceramic material.

Figure 8:
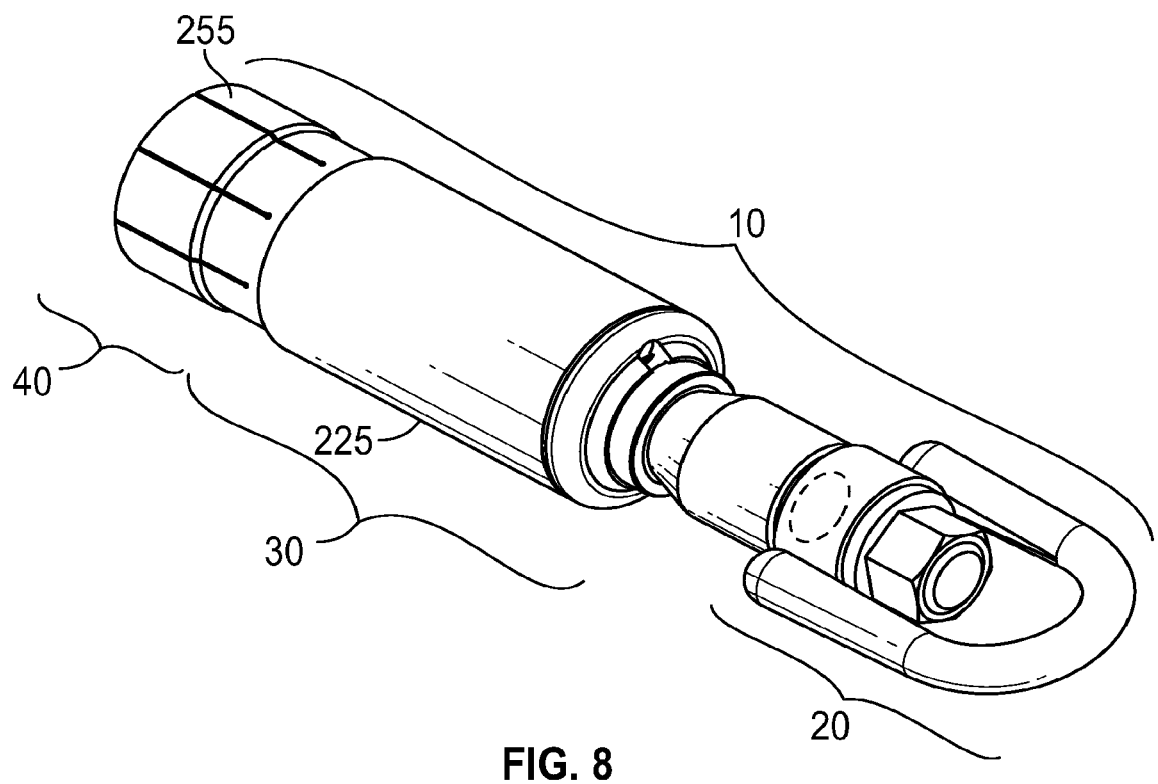
FIG. 8 is an external view of a pull head assembly according to the embodiments of the present disclosure.

FIG. 8 is an external view of the pull head assembly 10 with the mandrel assembly 30 connected to the collet assembly 40. In this illustration, a section of the collet assembly 40 extends outwardly and external to the mandrel body 225. The collet jacket fingers 255 are shown in an uncompressed state as compression takes place when the inner diameter of the mandrel body 225 exerts an inward force against the outer diameter of the collet jacket fingers 255. In operation, upon attaching the proximal end of a flexible pipe body to the collet assembly 40, the collet assembly 40 is inserted into the mandrel body 225 wherein the lead screw (not shown) is threadingly secured to the lead screw receiver (not shown). The lead screw assembly 20 is then rotated further pulling the mandrel body 30 over the collet assembly 40 and flexible pipe body wherein the collet jacket fingers 255 are compressed and collet jacket serrations (not shown) press into the outer layer of the flexible pipe body to further hold it in place. Rotation of the lead screw assembly 20 in the opposite direction moves the mandrel body 225 away from the collet assembly.

Figure 9:
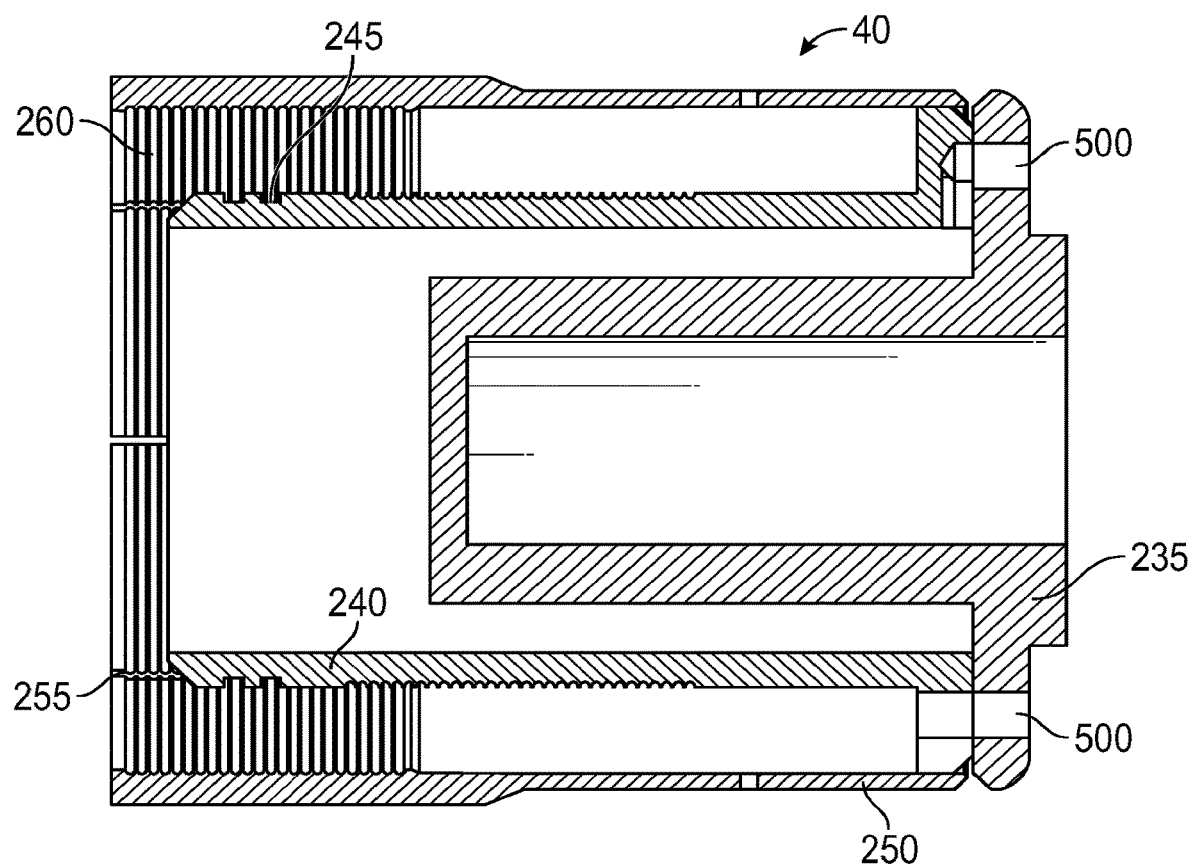
FIG. 9 is a cross sectional view of a collet jacket assembly according to the embodiments of the present disclosure.

FIG. 9 provides a cross sectional view of the collet assembly 40 showing the collet jacket 250, the collet jacket fingers 255, the collet jacket serrations 260, the pipe insert 240 disposed within the collet jacket 250, and the lead screw receiver 235 disposed within the pipe insert. O-ring grooves 245 radially surrounding the outer diameter of pipe insert 240 are also depicted. Typically, the pipe insert 240, the collet jacket 250, and the lead screw receiver 235 are welded together. However, other methods such as milling, casting, or bolting are contemplated. The pressure ports 500 are also depicted as being able to access the bore of a flexible pipe body and the annulus of the pipe body. The internal threads of the lead screw receiver 235 are not depicted. Bore access allows operators to access the interior of the flexible pipe body through which fluids are designed to flow. The bore access allows the bore of the pipe and the internal integrity of the internal pressure sheath layer 101 of FIG. 1 to be tested without removing the collet assembly 40. Likewise, the pipe annulus, which is the space between the outer diameter of the internal pressure sheath 101 and the inner diameter of the external sheath layer 104. In other words, the space located between two concentric plastic layers where the armors that support the flexible pipe body 100 are found. By providing annular access through the pressure ports 500, an operator can determine the permeability of the internal pressure sheath and the external sheath layer. Since one of the main concerns for flexible pipe integrity is the presence of water in the annulus, this can be due to either due to condensation or damage to the outer sheath. Corrosion from water, and especially salt water or condensation in the presence of $CO_2$ or $H_2S$ can cause corrosion of the armor layers. Therefore, annular access is important in order to perform vacuum or pressure testing of the flexible pipe body.

Figure 10:
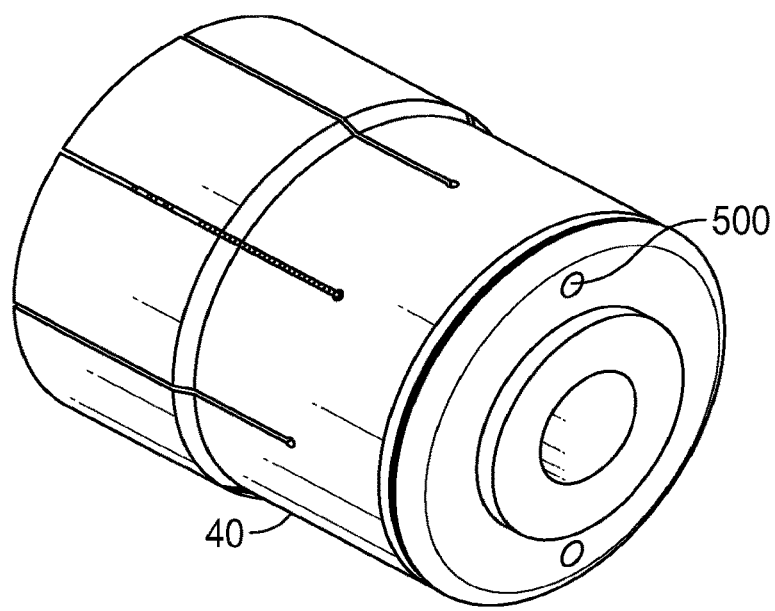
FIG. 10 is an external view of a collet jacket assembly according to the embodiments of the present disclosure.

FIG. 10 is an external view of FIG. 9, wherein the pipe insert 240 and the collet jacket serrations 260 are not shown. As can be seen, the pressure ports 500 are depicted as being at the proximal end of the collet assembly 40.

Figure 11:
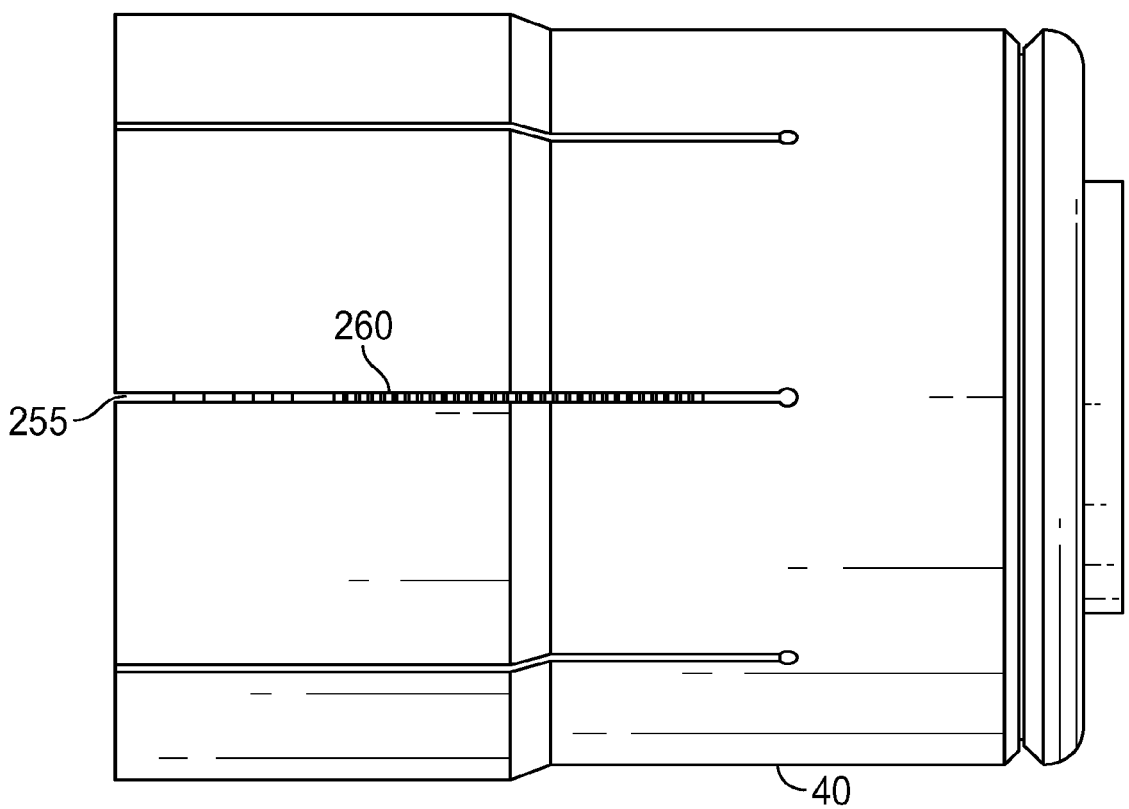
FIG. 11 is an alternate external view of a collet jacket assembly according to the embodiments of the present disclosure.

FIG. 11 is another external view of FIG. 10, wherein the pipe insert 240, lead screw receiver 235, and pressure ports 500 are not shown. This illustration shows the collet jacket serrations 260 as seen between the collet slits 255 of the collet assembly 40.

Figure 12:
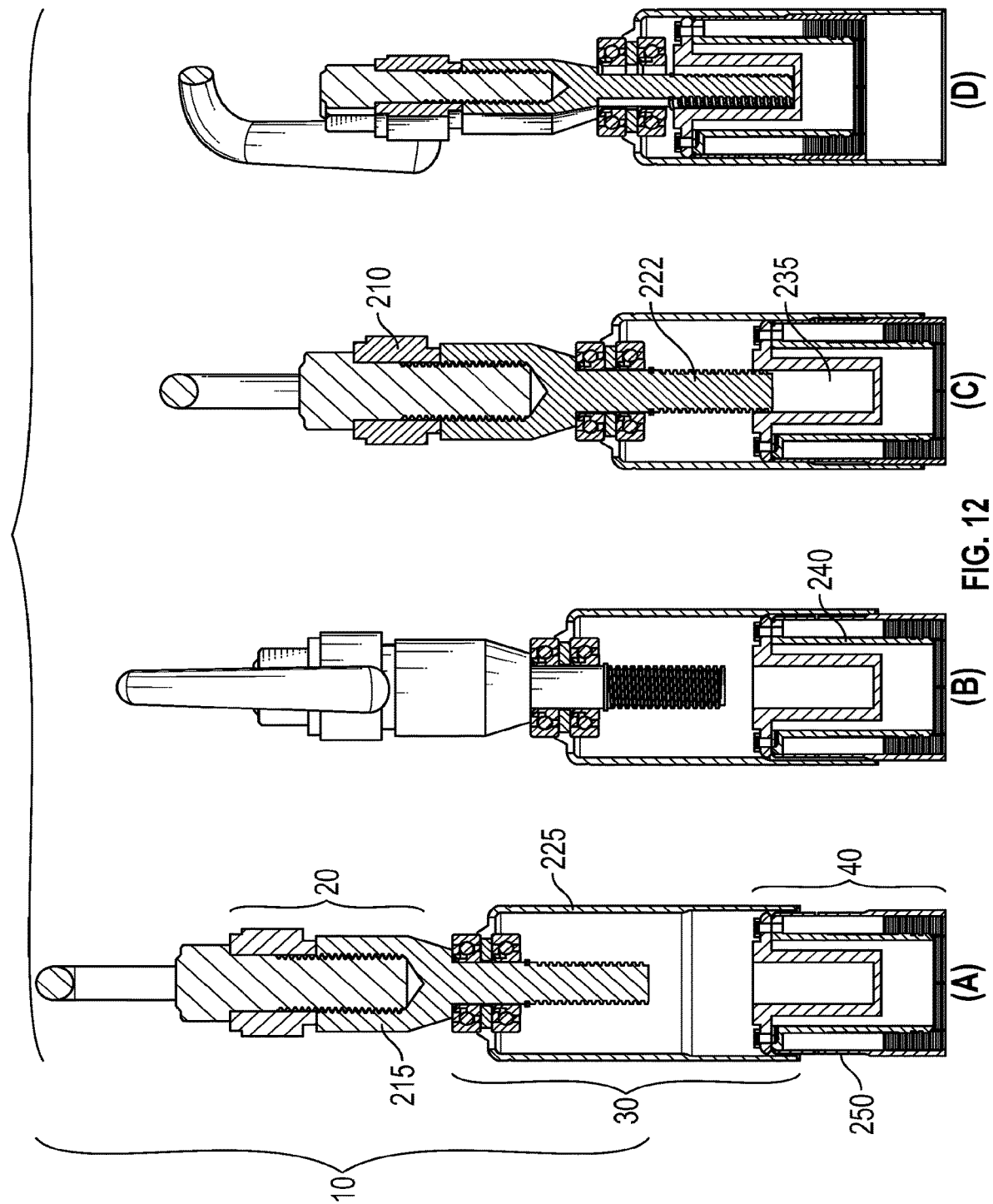
FIG. 12 is a cross sectional view of a pull head assembly in varying stages of assembly, showing the collet jacket assembly retracted, partially within the mandrel assembly, and fully within the mandrel assembly according to the embodiments of the present disclosure.
Figure 13A:
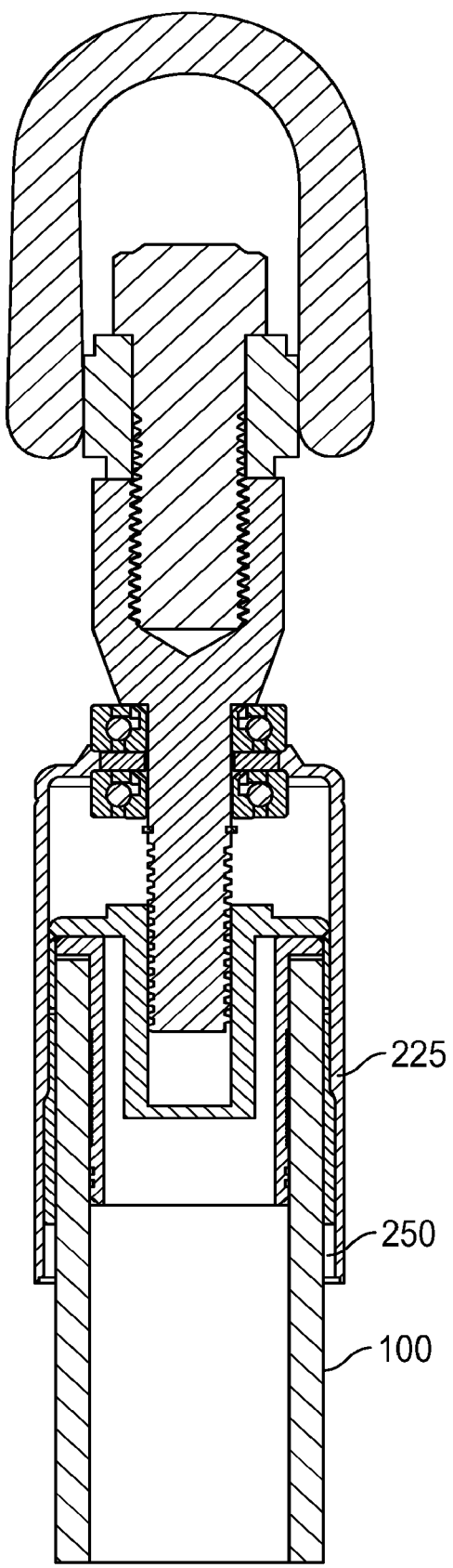
FIG. 13A is a cross sectional view of a pull head connected to flexible pipe within a partially disengaged collet assembly according to the embodiments of the present disclosure.
Figure 13B:
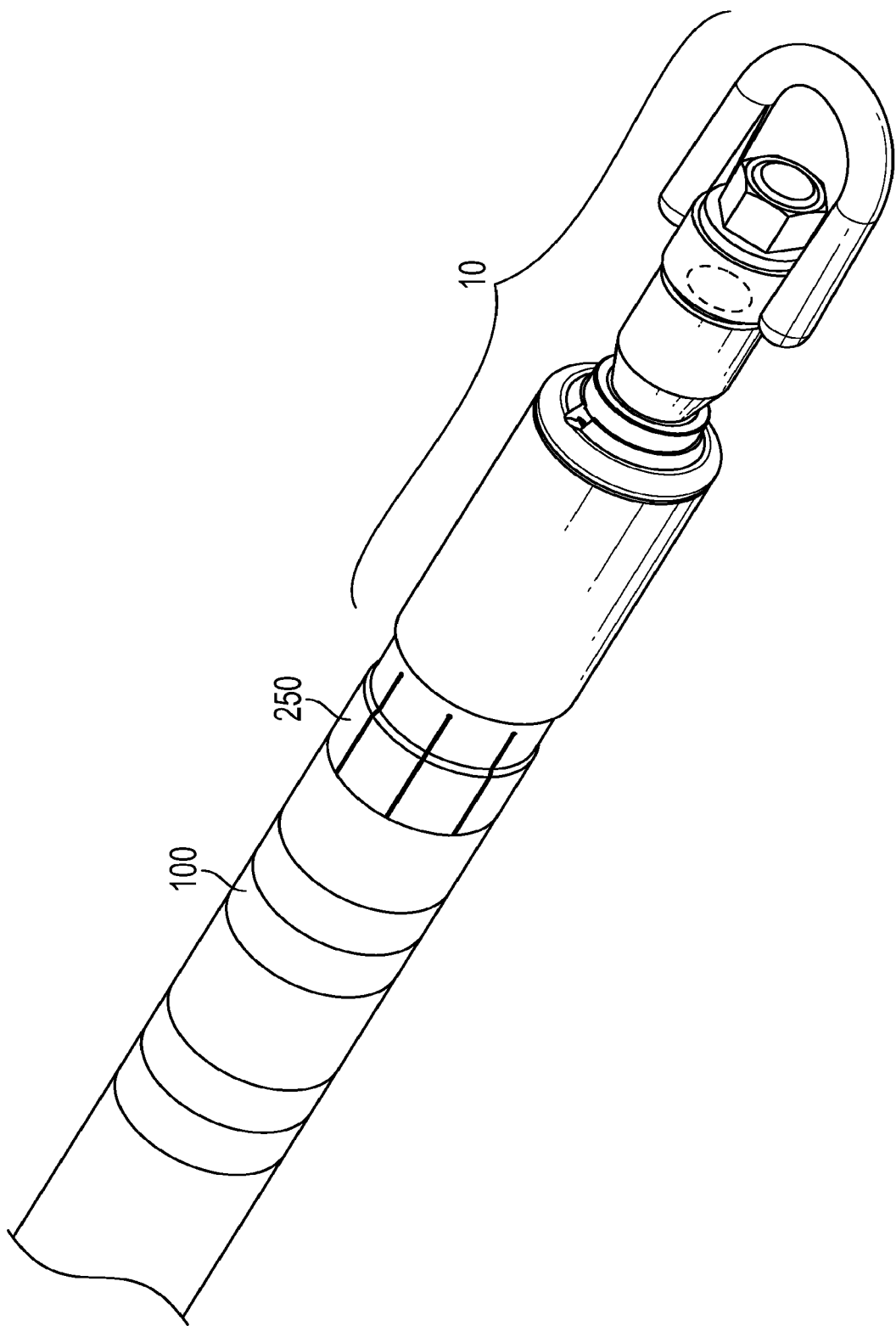
FIG. 13B is an external view of the pull head connected to flexible pipe within a disengaged collet assembly according to the embodiments of the present disclosure.

FIG. 12 illustrates the pull head assembly 10 in four stages of assembly, Stage A, Stage B, Stage C and Stage D. In Stage A, when the collet jacket 250 is exposed and extending from the mandrel body 225, a flexible pipe body 100, as seen in FIGS. 13A and 13B, can be inserted underneath the collet jacket 250 wherein the collet jacket 250 covers the proximal portion of the external sheath of the flexible pipe body 100. In the insertion process, first an annular ring 305 as depicted in FIG. 2, can be inserted around the shield layer 104 of the pipe body 100 and can insert into the distal end of the mandrel assembly 40 after full engagement. Referring back to FIG. 12, the collet jacket 250 is then slid over the external sheath of the flexible pipe 100 and the pipe insert 240 is positioned beneath the liner of the flexible pipe body 100. The flexible pipe body 100, now enclosed by the collet jacket 250 is inserted into the mandrel body 225, the mandrel body 225 having been previously secured to the lead screw assembly 20. The collet jacket assembly 40 is positioned to secure the lead screw 215 to the lead screw receiver 235. The rotation, due to the outwardly extending threads on the distal portion of the lead screw mandrel 222 making contact with the inwardly facing threads of the lead screw receiver 235, causes the mandrel assembly 30 to be pushed over the collet jacket assembly 40 and flexible pipe body. In the process of pulling the pipe, secured to the collet assembly 40, into the mandrel body 225, external pressure from the inner diameter of the of the mandrel body 225 compresses the collet jacket 250 against the external sheath of the flexible pipe body 100. When the collet jacket 250 assembly is pulled into the mandrel body 225, the flexible pipe body 100 is externally secured by the collet jacket 250 and internally secured by the pipe insert 240. The O-ring or O-rings (not shown) provide an internal seal between the pipe insert and the liner of the flexible pipe body 100.

FIGS. 13A and 13B show illustrative embodiments of the present disclosure wherein the pull head assembly 10 is coupled to flexible pipe body 100. FIG. 13A is a cross sectional view of the flexible pipe body 100 within the collet jacket 250 into which an inward force is being exerted by the mandrel body 225 as the collet jacket 250 and the flexible pipe body 100 are retracted within the mandrel body 225. FIG. 13B is an external view of the pull head assembly 10 showing an collet jacket 250 just before engagement. and a flexible pipe body 100 inserted therein. These illustrative embodiments, as well as other illustrative embodiments described herein, provide a pull head assembly that forms an effective seal and allows for pressure testing on site, and is also removable for subsequent use on other flexible pipe bodies.

Distal, in certain instances as used herein, can be defined as oriented upstream from the end of a pipe.

Proximal, in certain instances as used herein, can be defined as oriented downstream from the end of a pipe.

Inward, outwardly, outer diameter or OD, in certain instances as used herein, can be defined as away from a central axis in a direction substantially perpendicular to such a central axis.

Inward, inwardly, inner diameter or ID, in certain instances as used herein, can be defined as toward a central axis in a direction substantially perpendicular to such a central axis.

As used herein, the term "fluid" refers to a non-solid material such as a gas, a liquid or a colloidal suspension capable of being transported through a pipe, line or conduit. Examples of fluids include by way of non-limiting examples the following: natural gas, propane, butane, gasoline, crude oil, mud, water, nitrogen, sulfuric acid and the like.

A pipe, for purposes of clarification, has an axial direction which contains a bore through which liquids and gases flow. The pipe further has a radial direction which is perpendicular to the axial direction. Each layer of pipe that makes up the flexible pipe in the embodiments herein has an inner diameter (ID) oriented toward the bore and an outer diameter (OD) oriented toward the external side of the pipe. Unless otherwise noted these directional descriptions also apply to the fittings or methods themselves.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A method of implementing a pull head, comprising:
implementing a lead screw assembly at least in part by implementing a lead screw having a proximal end and a distal end with outward facing threads;
implementing a mandrel assembly at least in part by:
implementing a mandrel body having a proximal end, a distal end, and an inner diameter; and
securing a screw retainer that is adapted to receive the lead screw to the proximal end of the mandrel body; and
implementing a collet assembly having a proximal end and a distal end at least in part by implementing:
implementing a collet jacket with an outer diameter and an inner diameter that is adapted to secure an outer diameter of a flexible pipe body;
implementing a pipe insert with an inner diameter and an outer diameter that is adapted to secure an inner diameter of the flexible pipe body; and
implementing a screw receiver with a bore having inward facing threads adapted to threadingly engage the outward facing threads on the lead screw.

2. The method of claim 1, comprising:
disposing the lead screw within a central bore of the screw retainer;
engaging the outward facing threads on the lead screw with the inward facing threads on the screw receiver; and
rotating the lead screw in a first direction to pull the collet assembly into the mandrel body to cause the inner diameter of the mandrel body to compress the collet jacket radially inward such that the inner diameter of the collet jacket engages the outer diameter of the flexible pipe body.

3. The method of claim 2, comprising rotating the lead screw in a second direction opposite the first direction to push the collet assembly out from the mandrel body to enable the collet jacket to expand radially outward such that the inner diameter of the collet jacket disengages from the outer diameter of the flexible pipe body.

4. The method of claim 1, wherein implementing the lead screw assembly comprises:
   implementing the proximal end of the lead screw with other inward facing threads;
   securing a pull ring to a swivel lift; and
   securing the swivel lift to the lead screw via a bolt at least in part by inserting the bolt through the swivel lift and rotating the bolt such that other outward facing threads on the bolt engage the other inward facing threads on the lead screw.

5. The method of claim 1, wherein implementing the collet assembly comprises implementing a pressure port through the pipe insert and the screw receiver.

6. The method of claim 1, wherein implementing the collet jacket comprises implementing the collet jacket such that the outer diameter of the collet jacket is greater than the inner diameter of the mandrel body while the collet jacket is outside of the mandrel body.

7. The method of claim 1, wherein implementing the collet jacket comprises cutting slits into the collet jacket to implement fingers that enable the collet jacket to be compressed radially inward.

8. A pull head comprising:
   a lead screw, wherein the lead screw comprises a distal end with outward facing threads;
   a screw retainer, wherein the screw retainer comprises a central bore configured to retain the lead screw such that the distal end of the lead screw extends through the screw retainer;
   a mandrel body, wherein the screw retainer is secured to a proximal end of the mandrel body; and
   a collet assembly, wherein the collet assembly comprises:
      a collet jacket configured to engage an outer layer of a flexible pipe;
      a pipe insert configured to engage an inner layer of the flexible pipe; and
      a screw receiver secured to the collet jacket and the pipe insert, wherein the screw receiver comprises inward facing threads configured to engage the outward facing threads on the lead screw to enable:
         rotation of the lead screw in a first direction to pull the collet assembly into the mandrel body such that the collet jacket is compressed radially inward against the outer layer of the flexible pipe; and
         rotation of the lead screw in a second direction opposite the first direction pushes the collet assembly out from the mandrel body to enable the collet jacket to expand radially away from the outer layer of the flexible pipe.

9. The pull head of claim 8, comprising:
   a pull ring configured to enable a cable to be attached to the pull head;
   a swivel lift secured to the pull ring; and
   a bolt inserted through the swivel lift and secured to the lead screw to enable the pull ring to rotate relative to the lead screw.

10. The pull head of claim 8, wherein an outer surface diameter of the collet jacket when disposed outside of the mandrel body is greater than an inner surface diameter of the mandrel body.

11. The pull head of claim 8, wherein the collet jacket comprises fingers separated by slits to enable the collet jacket to be compressed radially inward.

12. The pull head of claim 8, wherein the screw retainer comprises ball bearings.

13. The pull head of claim 8, wherein the screw receiver is welded to the collet jacket and the pipe insert.

14. The pull head of claim 8, comprising a seal disposed within a groove that is formed along an outer surface of the pipe insert, wherein the seal is configured to be compressed against the inner layer of the flexible pipe to facilitate sealing the flexible pipe in the pull head.

15. The pull head of claim 8, wherein the collet assembly comprises a pressure port formed through the pipe insert and the screw retainer to enable fluid pressure within an annulus, a bore, or both of the flexible pipe to be tested.

16. A method of deploying a pull head, comprising:
   inserting an end of a flexible pipe into a collet assembly of the pull head at least in part by:
      disposing a collet jacket of the collet assembly circumferentially around an outer layer of the flexible pipe, wherein the collet jacket is secured to a screw receiver of the collet assembly; and
      disposing a pipe insert of the collet assembly under an inner layer of the flexible pipe, wherein the pipe insert is secured to the screw receiver of the collet assembly;
   inserting the collet assembly into a mandrel body of the pull head until inward facing threads on the screw receiver of the collet assembly engage outward facing threads on a lead screw that extends through a screw retainer of the pull head into the mandrel body; and
   rotating the lead screw relative to the screw receiver to pull the collet assembly farther into the mandrel body such that the mandrel body compresses the collet jacket of the collet assembly radially inward against the outer layer of the flexible pipe to facilitate securing the pull head to the flexible pipe.

17. The method of claim 16, comprising rotating the lead screw in an opposite direction relative to the screw receiver to push the collet assembly out from the mandrel body to enable the collet jacket of the collet assembly to expand radially outward away from the outer layer of the flexible pipe to facilitate removing the pull head from the flexible pipe.

18. The method of claim 17, comprising:
   inserting another end of another flexible pipe into the collet assembly of the pull head at least in part by:
      disposing the collet jacket of the collet assembly circumferentially around another outer layer of the other flexible pipe; and
      disposing the pipe insert of the collet assembly under another inner layer of the other flexible pipe;
   inserting the collet assembly into the mandrel body of the pull head until the inward facing threads on the screw receiver of the collet assembly engage the outward facing threads on the lead screw that extends through the screw retainer of the pull head into the mandrel body; and
   rotating the lead screw relative to the screw receiver to pull the collet assembly farther into the mandrel body such that the mandrel body compresses the collet jacket of the collet assembly radially inward against the other outer layer of the other flexible pipe to facilitate securing the pull head to the other flexible pipe.

19. The method of claim 16, comprising:
- securing a cable to a pull ring of the pull head that is secured to the lead screw; and
- pulling the pull head and the flexible pipe through a bore via the cable.

20. The method of claim 16, wherein inserting the end of the flexible pipe into the collet assembly comprises compressing a seal that is disposed in a groove formed along an outer surface of the pipe insert against the inner layer of the flexible pipe to facilitate sealing the flexible pipe in the pull head.

* * * * *